Feb. 23, 1937.　　　C. P. HOCHGESAND　　　2,071,526
OVERFLOW CONDUIT FOR RECTIFYING COLUMNS
Filed April 5, 1935
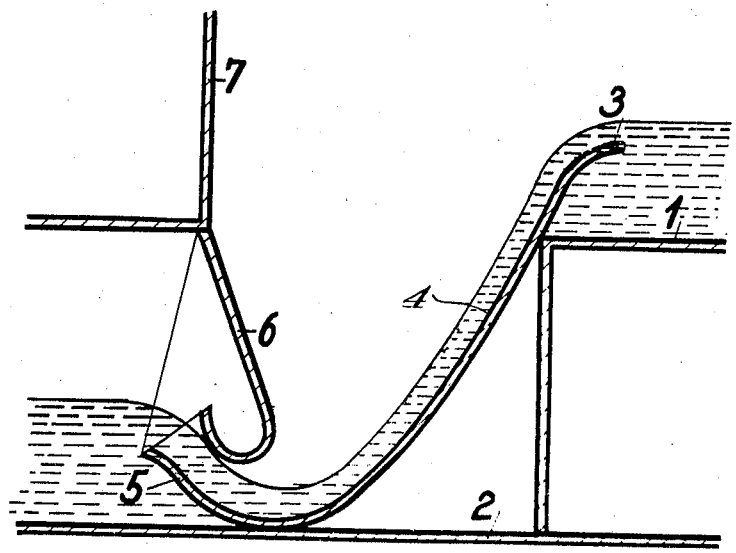
Inventor:
Carl Peter Hochgesand,
By Potter, Pierce & Scheffler,
Attorneys.

Patented Feb. 23, 1937

2,071,526

UNITED STATES PATENT OFFICE

2,071,526

OVERFLOW CONDUIT FOR RECTIFYING COLUMNS

Carl Peter Hochgesand, Solln, near Munich, Germany, assignor to Gesellschaft für Linde's Eismaschinen A. G., Munich, Germany, a corporation of Germany Application April 5, 1935, Serial No. 14,952
In Germany May 30, 1934

2 Claims. (Cl. 261—114)

This invention relates to overflow conduits for countercurrent gas and liquid contacting apparatus, such as plate type rectifying columns.

In general, in apparatus of this type the liquid flows from one rectifier plate over an overflow weir through a downtake conduit or shaft to the next lower plate, where a further weir provides a liquid seal and a uniform afflux of liquid. In order to overcome the flow resistance and the pressure head in the rectifying column a certain pressure differential of the liquid in the downtake conduit is necessary; that is, the liquid stands in the downtake conduits to the individual plates at a higher level than the liquid level on the plates, to an extent dependent on the burden on the column. When the colum is heavily burdened it can easily occur that the downtake conduit becomes filled with liquid up to the level of the next higher plate and thus prevents the regular flow of the liquid and lowers the efficiency of the column.

The object of the invention is the provision of a downtake conduit which will avoid these disadvantages.

In accordance with the invention, the downtake conduit is constructed in such form that not only the potential energy of a liquid column, but also and particularly the kinetic energy of the liquid in falling from one plate to another is utilized in overcoming the pressure head and the flow resistance. To this end, the downtake is so shaped that the liquid does not fall down more or less freely in it, thereby dissipating the available pressure head in eddy currents, but the liquid, on the contrary, is conducted in an unbroken current down a surface of hydraulically suitable shape without any eddying, thereby conserving substantially all of the potential kinetic energy of the fall.

A suitable form for a liquid downtake conduit embodying the invention is shown by way of illustration in the accompanying drawing which is a section through a downtake column having annular plates such as are described in U. S. Patent 1,950,313 to Richard Linde. In the form shown in the drawing the liquid on plate 1 overflows weir 3 onto downtake surface 4 by which it passes in a uniform and undisturbed current over the weir 5 onto plate 2.

The downtake surface 4 is stream-lined according to known hydrodynamic principles so that the liquid flowing down it forms no eddies or cross-currents and does not leave the surface. In this way the head of the liquid falling is substantially completely converted into kinetic energy of flow and is effective in overcoming resistances to flow. For this purpose the part 3 and the upper portion of part 4 are given the form of a parabolic curve, for example. The forewall 6, 7 of the downtake is advantageously so formed that between 4 and 6 there is a funnel-shaped space widening out above in order that the foam, which has formed on the plate during the rectification, can be dissipated with the least possible disturbance of the liquid stream. The forewall 6 is also carried so far down that the liquid in the lower part of the downtake will form a seal to prevent the flow of gases through the downtake.

The new downtake conduit of the invention has the advantage that the level of the liquid in the downtakes of the various plates is lowered. For this reason it is possible to decrease the amount of liquid retained on the plates in order to provide a seal and hereby to build shorter rectifying columns, which is especially advantageous in low temperature technology because of the ensuring decrease in cold losses.

Furthermore the dependence of the capacity of the column on the head of liquid in the downtakes is much less with the uniform unbroken flow obtained with the invention than with the free full downtake of the previously used downtakes. This is of particular advantage in the case of the annular plate columns of U. S. Patent 1,950,313, because in these columns the available area for downtake is relatively limited and the advantage of the downtake of the invention increases with decreasing available downtake area. With annular rectifier plates it is, for example, frequently the case that the diameter of the plates and therefore that of the rectifying column cannot be proportioned to the gas volume to be handled, but must be made relatively larger in order to provide for the regular and steady downtake of the liquid. Thus the use of the downtake structure of this invention in such rectifying columns makes it possible to reduce not only the height, but also the diameter of the column, for a given capacity. A further advantage of the new downtake is that the rectifying columns can be overloaded without their effectiveness stopping at a rather small overload because of filling up of the downtake channels.

The use of the downtakes of the invention is, of course, not restricted to annular rectifier plates, but is advantageous in all plate-type gas and liquid contact apparatus, especially wherever the size of the overflow weir is limited for constructional reasons.

I claim:

1. A liquid downtake conduit for conveying liquid from a plate of a rectifying column to the next lower plate thereof comprising a weir element at the outlet of the upper plate, a weir element at the inlet of the lower plate, a flow guiding surface joining said weir elements shaped to provide even flow of liquid from the upper plate to the lower plate without interruption and without the formation of eddies, and a forewall member forming with said flow guiding surface a conduit of increasing cross-section from bottom to top whereby foam forming on the liquid may dissipate without disturbing the flow of the liquid.

2. A liquid downtake conduit for conveying liquid from a plate of a rectifying column to the next lower plate thereof comprising a weir element at the outlet of the upper plate, a weir element at the inlet of the lower plate and a flow guiding surface joining the lip of the upper weir element with the lip of the lower weir element in an uninterrupted stream-line whereby even flow of liquid from the upper plate to the lower plate without interruption and without formation of eddies is provided.

CARL PETER HOCHGESAND.